United States Patent
Kusakabe (10) Patent No.: US 12,009,699 B2
(45) Date of Patent: Jun. 11, 2024

(54) ROTOR AND BRUSHLESS MOTOR

(71) Applicant: MABUCHI MOTOR CO., LTD., Chiba (JP)

(72) Inventor: Wataru Kusakabe, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 131 days.

(21) Appl. No.: 17/666,408

(22) Filed: Feb. 7, 2022

(65) Prior Publication Data

US 2022/0255376 A1    Aug. 11, 2022

(30) Foreign Application Priority Data

Feb. 9, 2021    (JP) .................................. 2021-018921

(51) Int. Cl.
*H02K 1/276*    (2022.01)
*H02K 21/16*    (2006.01)

(52) U.S. Cl.
CPC ........... *H02K 1/2766* (2013.01); *H02K 21/16* (2013.01)

(58) Field of Classification Search
CPC .. H02K 1/2766; H02K 21/16; H02K 2213/03; H02K 1/2773; H02K 1/28; H02K 21/14
See application file for complete search history.

(56) References Cited

U.S. PATENT DOCUMENTS

| | | |
|---|---|---|
| 11,211,838 B2 | 12/2021 | Aida et al. |
| 2017/0018980 A1* | 1/2017 | Yang ...................... H02K 29/03 |
| 2019/0273407 A1* | 9/2019 | Munoz .................. H02K 1/2766 |

FOREIGN PATENT DOCUMENTS

| | | | |
|---|---|---|---|
| CN | 109995164 A | * 7/2019 | ........... H02K 21/044 |
| JP | 2010252417 A | 11/2010 | |
| JP | 5918958 B2 | 5/2016 | |
| WO | WO2018189822 A1 | 7/2019 | |

OTHER PUBLICATIONS

Translation of CN109995164A retrieved from Epsace.net. Published Jul. 9, 2019 https://worldwide.espacenet.com/patent/search/family/067135104/publication/CN109995164A?q=201910328938. Retrieved 2023.*

* cited by examiner

*Primary Examiner* — Christopher M Koehler
*Assistant Examiner* — Riley Owen Stout
(74) *Attorney, Agent, or Firm* — HAUPTMAN HAM, LLP (57) ABSTRACT

A rotor includes a cylindrical core main body having a columnar space on a rotation center side. A plurality of magnet accommodating hole pair penetrates the core main body in an axial direction and includes a pair of magnets accommodating holes arranged in a V shape so as to be separated from each other toward one side of the core main body which is a stator side in a radial direction. A plurality of permanent magnets is fixed in the respective magnet accommodating holes. The plurality of permanent magnets come into pressure contact with the permanent magnet from the q-axis side and the other side in the radial direction. A protrusion forming space penetrates in the axial direction and extending from a side surface to the one side in the radial direction along the side surface.

9 Claims, 8 Drawing Sheets

OTHER END SIDE ←——————→ ONE END SIDE

ROTOR AND BRUSHLESS MOTOR

RELATED APPLICATIONS

The present application claims priority to Japanese Application No. 2021-018921 filed Feb. 9, 2021, the disclosure of which is hereby incorporated by reference herein in its entirety.

BACKGROUND

Technical Field

The present invention relates to a rotor in which a permanent magnet is disposed inside a core main body, and a brushless motor including the rotor.

Related Art

Conventionally, a so-called interior permanent magnet (IPM) rotor in which a permanent magnet is disposed inside a core main body is known. In such a rotor, centrifugal force generated by rotation of the rotor acts on the permanent magnet, so that the permanent magnet moves, which may cause vibration and noise or damage of the permanent magnet. For this reason, in the IPM rotor, it is required to reliably fix the permanent magnet to the core main body, and various methods have been proposed so far (for example, refer to Japanese Patent No. 5918958, Republication of PCT International Publication No. WO 2018-189822 filed in Japanese, and Japanese Unexamined Patent Application Publication No. 2010-252417).

As an example, Japanese Patent No. 5918958 discloses a rotor core (a core main body) including: a press-fitting protrusion that forms a protrusion in a radial direction to press-fit and fix the magnet; and a notch formed at a position radially separated from the magnet by sandwiching the press-fitting protrusion in a through hole in which a magnet (a permanent magnet) is disposed. According to Japanese Patent No. 5918958, the magnet is press-fitted and fixed by the press-fitting protrusion, and excessive pressure applied to the magnet is suppressed by the notch.

In addition, as another example, Republication of PCT International Publication No. WO 2018-189822 filed in Japanese discloses an IPM rotor which includes a first core sheet in which a spring plate portion is provided in a hole portion into which a magnet is inserted and a second core sheet in which a recess portion is provided at a position corresponding to a site where the spring plate portion of the first core sheet is provided, and is configured by laminating these core sheets. With such a configuration, when the magnet is inserted into the IPM rotor, the spring plate portion pushed and bent by the magnet can escape into the recess portion of the second core sheet, and the magnet can be held by the restoring force of the spring plate portion.

SUMMARY

However, for example, in the configuration of Japanese Patent No. 5918958, the press-in force becomes too large, and the rotor core may be scraped when the magnet is inserted into the rotor core to generate residue. In addition, since in Republication of PCT International Publication No. WO 2018-189822 filed in Japanese, a configuration in which core sheets having different shapes are laminated is provided, transferring is required, which leads to an increase in mold cost. Furthermore, there is a possibility of a flow of a magnetic flux being hindered depending on the positions of the protrusions, the recess portions, or the like, and the arrangement thereof is important from the viewpoint of securing the performance of the motor.

As a method of fixing the magnet, a method of using an adhesive without forming a protrusion or the like is also conceivable. However, the fixing method using the adhesive may require dedicated equipment for application depending on the type of adhesive, and in a case of a liquid adhesive, it takes time to cure the adhesive, and thus it is not preferable for improving production efficiency. In addition, since adhesives generally have an expiration date, attention is also required for management (storage) of the adhesives. Such a problem may occur in both an inner rotor type motor and an outer rotor type motor.

The present invention has been made in view of such a problem, and an object thereof is to provide a rotor and a brushless motor capable of fixing a permanent magnet with an appropriate press-in force while securing motor performance and suppressing manufacturing cost. Not limited to this object, it is another object of the present invention to achieve operational effects derived from each configuration described in the embodiments for carrying out the invention that will be described later, which cannot be obtained by the conventional technique.

(1) The rotor disclosed herein includes a cylindrical core main body that includes a plurality of laminated cores having the same shape and having a columnar space formed on a rotation center side, a plurality of magnet accommodating hole pairs that is provided to penetrate the core main body in an axial direction, includes a pair of magnet accommodating holes arranged in a V shape to be separated from each other toward one side of the core main body which is a stator side in a radial direction, and is provided to be separated from each other in a circumferential direction of the core main body, a plurality of permanent magnets accommodated and fixed in the respective magnet accommodating holes, protrusions provided in the magnet accommodating holes in one-to-one correspondence, protruding from a q-axis side as a magnetic pole boundary and another side in the radial direction in an extending direction of a side surface of the magnet accommodating hole on the q-axis side, and coming into pressure contact with the permanent magnets accommodated in the magnet accommodating holes from the q-axis side and the other side, and a protrusion forming space penetrating in the axial direction and extending from the side surface of the magnet accommodating holes to the one side in the radial direction along the side surface.

(2) It is preferable that a protrusion forming surface forming the protrusion forming space be connected to the other side surface on the other side in the radial direction forming the magnet accommodating holes.

(3) It is preferable that a length of the protrusions in a width direction orthogonal to a protruding direction be twice or less a plate thickness of one laminated core.

(4) It is preferable that the length of the protrusions in the width direction be equal to or greater than the plate thickness.

(5) It is preferable that the length of the protrusions in a protruding direction be longer than a length of the protrusion in a width direction orthogonal to the protruding direction.

(6) It is preferable that the rotor be disposed on the radially inner side of the stator, and the one side in the radial direction be a radially outer side and the other side in the radial direction be a radially inner side.

In addition, the motor disclosed herein includes the rotor disclosed in the above (6), a shaft that rotates integrally with the rotor, and the stator that is fixed to a housing, has a space in which the rotor is disposed on an inner diameter side, and has a coil.

According to the rotor and the brushless motor of the disclosure, since the protrusion is easily elastically deformed, the permanent magnet can be fixed to the core main body with appropriate press-in force. In addition, since the protrusion and the protrusion forming space do not hinder the flow of the magnetic flux, performance can be secured. Furthermore, since a special mold or a dedicated facility is unnecessary, the manufacturing cost can be suppressed.

DETAILED DESCRIPTION

A rotor and a brushless motor will be described as embodiments with reference to the drawings. The embodiments described below are merely examples, and there is no intention to exclude the application of various modifications and techniques that are not explicitly described in the following embodiments. Each configuration of the following embodiments can be implemented with various modifications without departing from the spirit thereof. In addition, selections according to necessity, or appropriate combinations are also possible.

First Embodiment

[1. Configuration]

Figure 1:
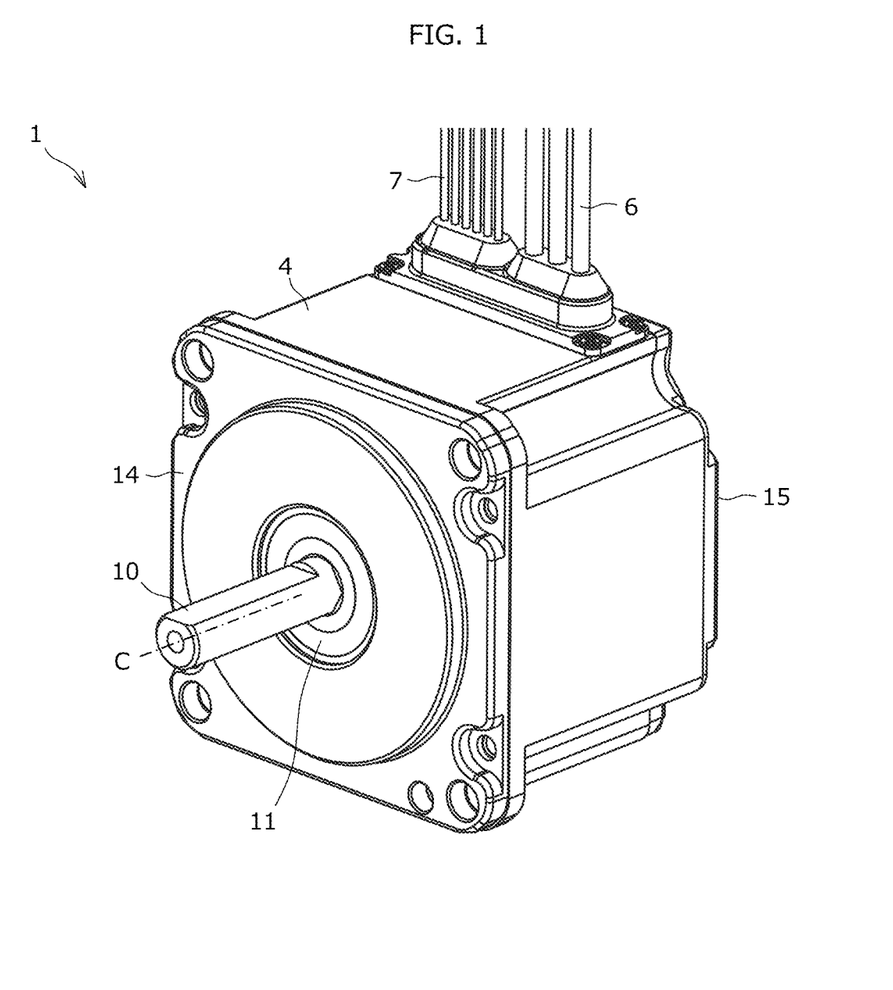
FIG. 1 is a perspective view of an inner rotor type brushless motor according to a first embodiment.
Figure 2:
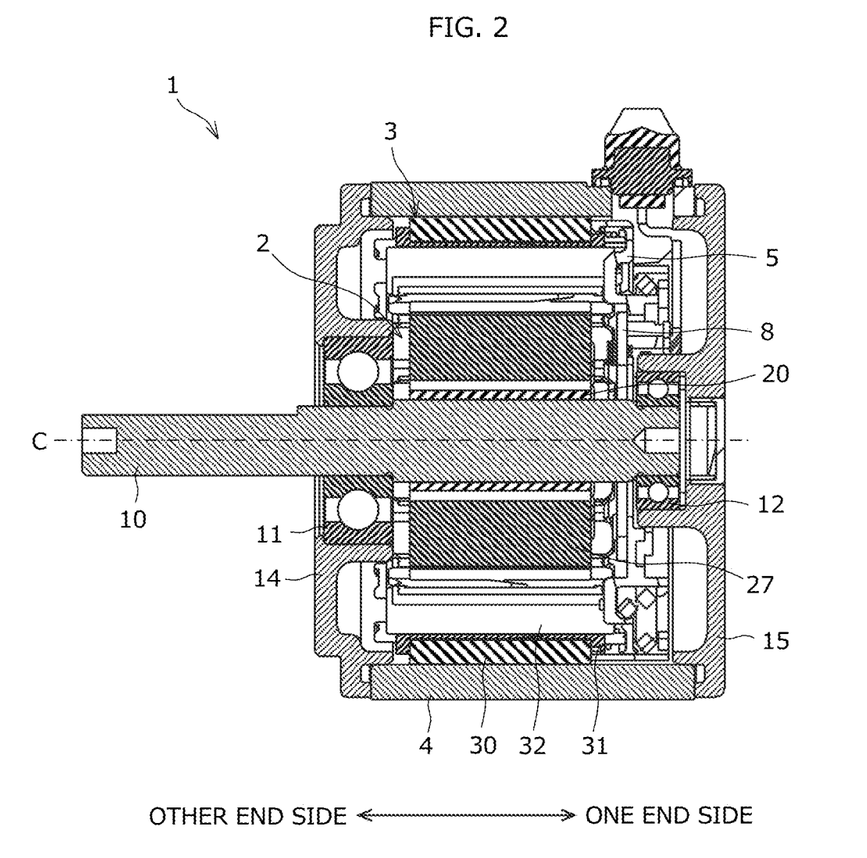
FIG. 2 is a cross-sectional view in an axial direction of the brushless motor of FIG. 1.

FIG. 1 is a perspective view of a brushless motor 1 (hereinafter referred to as a "motor 1") according to a first embodiment, and FIG. 2 is an axial sectional view of the motor 1. The motor 1 of the present embodiment is an inner rotor type brushless DC motor and is configured by incorporating a rotor 2 to which a shaft 10 is fixed and a stator 3 fixed to a housing 4 in the housing 4 forming an outer contour of the motor 1. The housing 4 has a tubular shape with both axial ends opened, an end bell 15 is fixed to an opening on one end side (right side in FIG. 2), and a front bell 14 is fixed to an opening on the other end side (output side, left side in FIG. 2). The external shape of the housing 4 of the present embodiment is a substantially rectangular parallelepiped. However, the shape of the housing 4 is not limited thereto.

Figure 3:
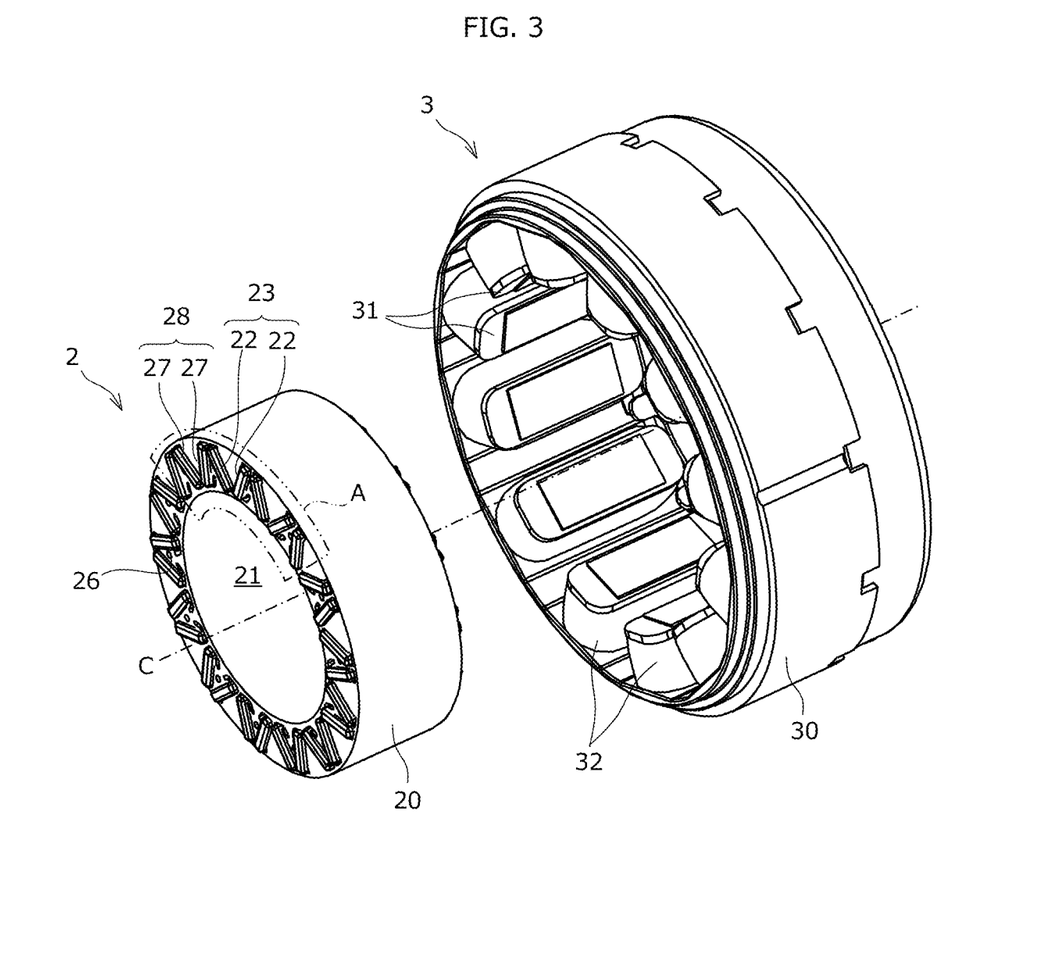
FIG. 3 is an exploded perspective view illustrating a rotor and a stator of the brushless motor of FIG. 1.

FIG. 3 is a perspective view illustrating the rotor 2 of the present embodiment disassembled from the stator 3, and the shaft 10, the housing 4, and the like are omitted. As illustrated in FIGS. 2 and 3, the stator 3 is a substantially cylindrical component having a space in which the rotor 2 is disposed on the inner diameter side, and includes an annular stator core 30 press-fitted and fixed to the housing 4 and a coil 32 wound around the stator core 30 via an insulator 31. As illustrated in FIGS. 1 and 2, the stator 3 of the present embodiment includes a lead wire 6 for power input connected to the coil 32, a lead wire 7 for sensor signal input/output, a lead wire stopping component 5 that supports the lead wire 6, and a substrate 8 having a rotation detection element that detects a signal in accordance with the rotational position of the rotor 2. The configuration of the stator 3 is not limited thereto, and for example, the lead wire stopping component 5 may be omitted, or a component for supporting the substrate 8 may be separately provided.

The shaft 10 is a rotating shaft that supports the rotor 2, and also functions as an output shaft that extracts output (mechanical energy) of the motor 1 to the outside. The shaft 10 is provided with bearings 11 and 12 at two positions with the rotor 2 interposed therebetween. In the present embodiment, the bearing 11 is fixed to the front bell 14 to rotatably support the intermediate portion of the shaft 10, and the bearing 12 is fixed to the end bell 15 to rotatably support the end (right end in the drawing) of the shaft 10.

As illustrated in FIGS. 2 and 3, the rotor 2 is an interior permanent magnet (IPM) rotor including a rotor core 20 (a core main body) that rotates integrally with the shaft 10 about a rotation center C, and a plurality of magnets 27 (permanent magnets) embedded inside the rotor core 20.

The plurality of magnets 27 is separately disposed to make one round in the circumferential direction of the rotor core 20, and two magnets 27 adjacent in the circumferential direction configure one magnet pair 28. In the present embodiment, the rotor 2 including 14 magnet pairs 28, that is, 28 magnets 27 are illustrated.

Figure 4:
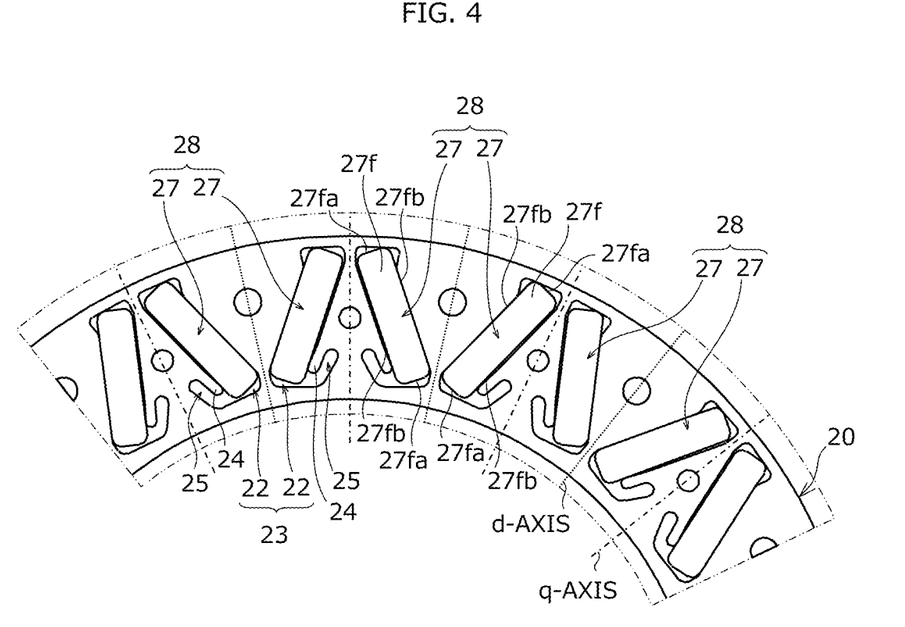
FIG. 4 is an enlarged plan view illustrating a portion A in FIG. 3 as viewed in the axial direction.
Figure 5:
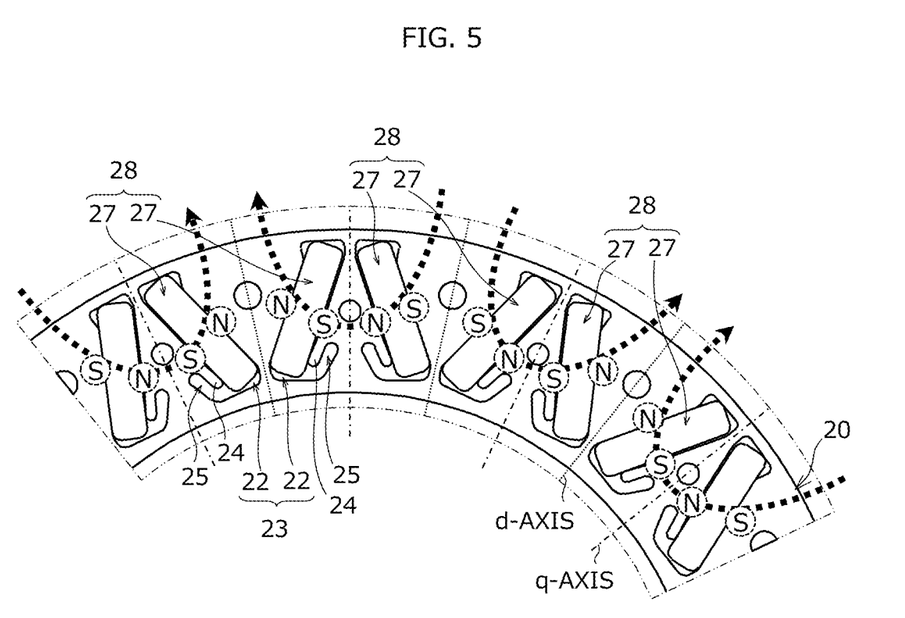
FIG. 5 is a view for explaining a flow of a magnetic pole and a magnetic flux of the rotor of FIG. 4.

FIGS. 4 and 5 are enlarged plan views of a portion surrounded by a two-dot chain line in FIG. 3. The two magnets 27 configuring one magnet pair 28 are disposed in a V shape to be separated from each other toward one side which is the stator 3 side in the radial direction of the rotor core 20. As described above, in the motor 1 to which the rotor 2 of the present embodiment is applied, the rotor 2 is disposed on the radially inner side of the stator 3. Therefore, the "one side" described above is the "radially outer side of the rotor core 20," and the "other side" that is the opposite side of the "one side" is the "radially inner side of the rotor core 20." As illustrated in FIG. 5, two magnets 27 configuring one magnet pair 28 are arranged such that the same poles face each other. On the other hand, the adjacent pairs of the magnets 28 are disposed such that opposite poles face each other. As a result, each pair of magnets 28 forms a magnetic pole (N pole or S pole) on the radially outer side (that is, the stator 3 side), and a flow of magnetic flux as indicated by a thick arrow in the drawing is generated. A straight line between the two magnets 27 configuring the pair of magnets 28 in the radial direction is the d-axis which is the magnetic pole center. In addition, a straight line between the adjacent pairs of magnets 28 in the radial direction is a q-axis which is a magnetic pole boundary. In FIGS. 4 and 5 and FIGS. 6 to 9 to be described later, the d-axis is indicated by a dotted line, and the q-axis is indicated by a one-dot chain line.

The magnets 27 have rectangular parallelepiped shape having a length equivalent to the axial length of the rotor core 20, and have rectangular end surfaces 27f facing one end side and the other end side in the axial direction when embedded in the rotor core 20. The end faces 27f of the magnets 27 have short sides 27fa and long sides 27fb.

Figure 6:
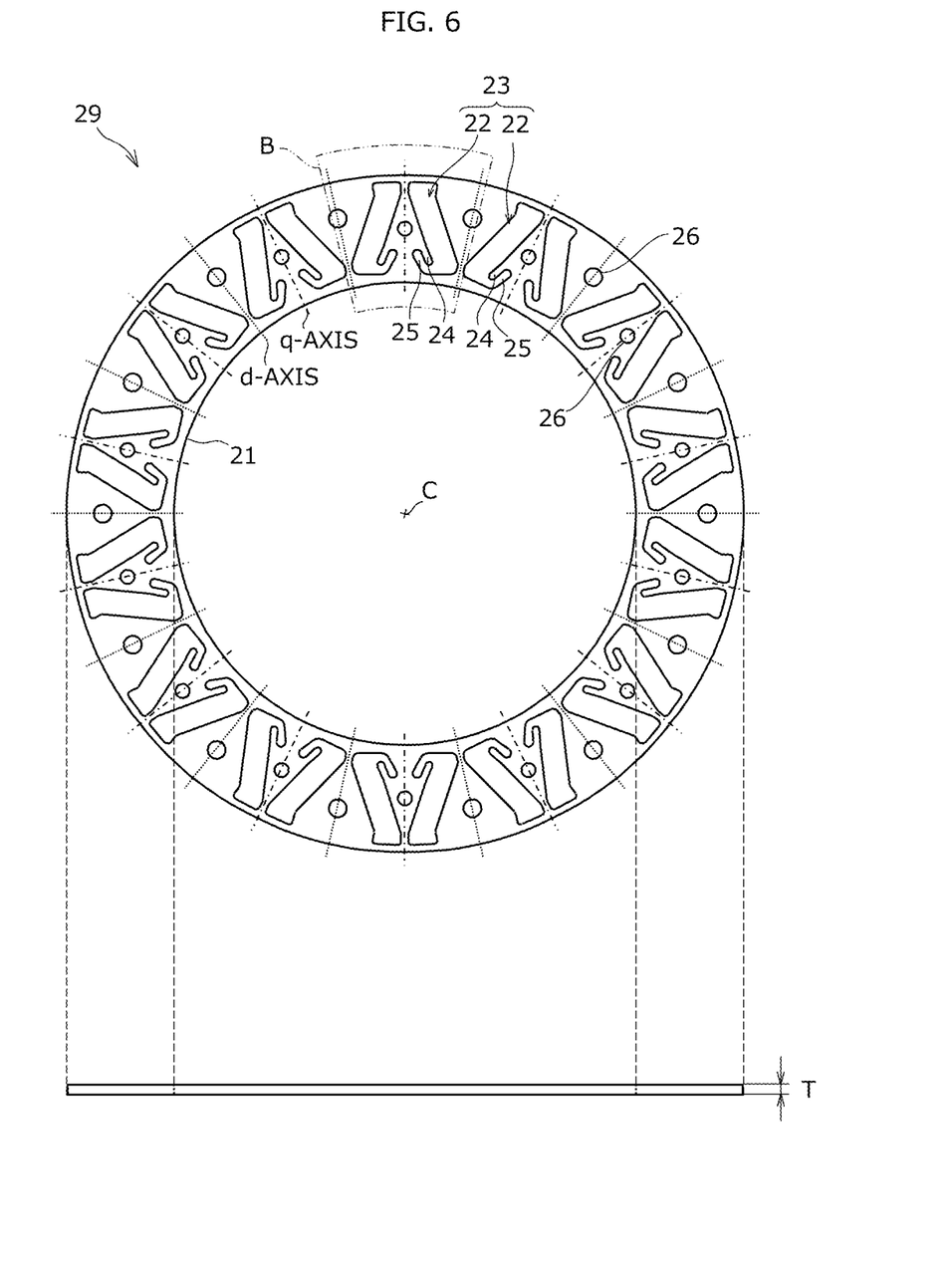
FIG. 6 is a view for explaining a laminated core configuring the rotor of FIG. 3.

The rotor core 20 is configured by laminating a plurality of laminated cores 29 in the axial direction, and has a cylindrical shape in which a columnar space is formed on the rotation center side. FIG. 6 illustrates a plan view and a side view of the laminated core 29 of the present embodiment side by side. The laminated core 29 is a thin electromagnetic steel plate having a shaft hole 21 (the above columnar space) to which the shaft 10 is fixed on the rotation center C side, and is formed in the same shape. A plurality of magnet accommodating holes 22 is provided to penetrate around the shaft hole 21 of the laminated core 29 in the axial direction. The magnet accommodating holes 22 are through holes in which the magnets 27 are accommodated and fixed. The plurality of magnet accommodating holes 22 is provided equal in number to the magnets 27 and are provided to correspond to the arrangement of the plurality of magnets 27 described above.

That is, the plurality of magnet accommodating holes 22 is separately disposed to make one round in the circumferential direction of the rotor core 20, and two magnet accommodating holes 22 adjacent in the circumferential direction configure one magnet accommodating hole pair 23. The two magnet accommodating holes 22 configuring one magnet accommodating hole pair 23 are arranged in a V shape to be spaced apart from each other toward the radially outer side symmetrically with respect to the d-axis. A positioning hole 26 is formed between the magnet accommodating holes 22 adjacent in the circumferential direction with a gap from each magnet accommodating hole 22.

Figure 7A:
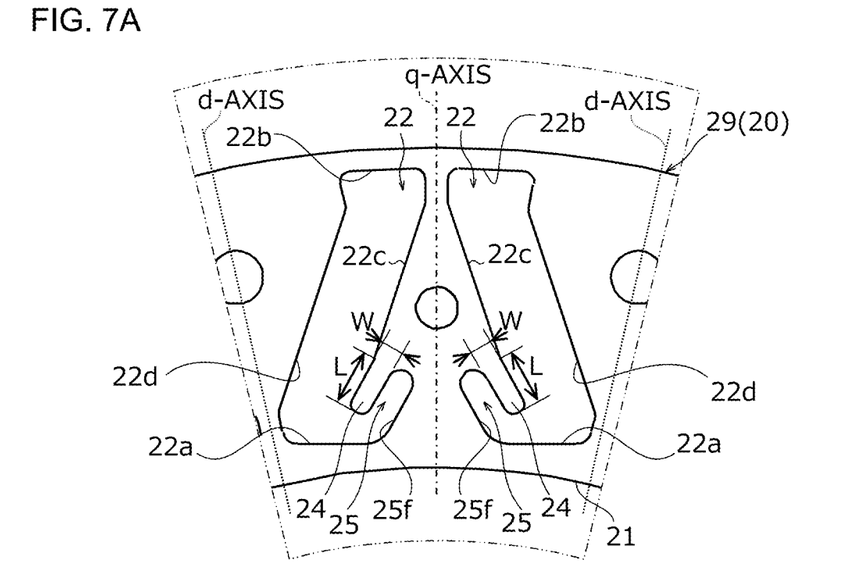
FIG. 7A is an enlarged view of a portion B in FIG. 6.

As illustrated in FIG. 7A, the magnet accommodating hole 22 of the present embodiment is formed in a substantially parallelogram shape as viewed in the axial direction. The magnet accommodating hole 22 is defined by two surfaces extending in the axial direction and a direction substantially perpendicular to the q-axis and two surfaces extending in the axial direction and inclined in a direction away from the q-axis toward the radially inner side. Hereinafter, among the former two surfaces, the inner surface (the other side surface) in the radial direction is referred to as an inner side surface 22a, and the outer side surface in the radial direction is referred to as an outer surface 22b. Among the latter two surfaces, a surface (a side surface) on the q-axis side is referred to as a q-axis side surface 22c, and a surface on the d-axis side is referred to as a d-axis side surface 22d.

Figure 7B:
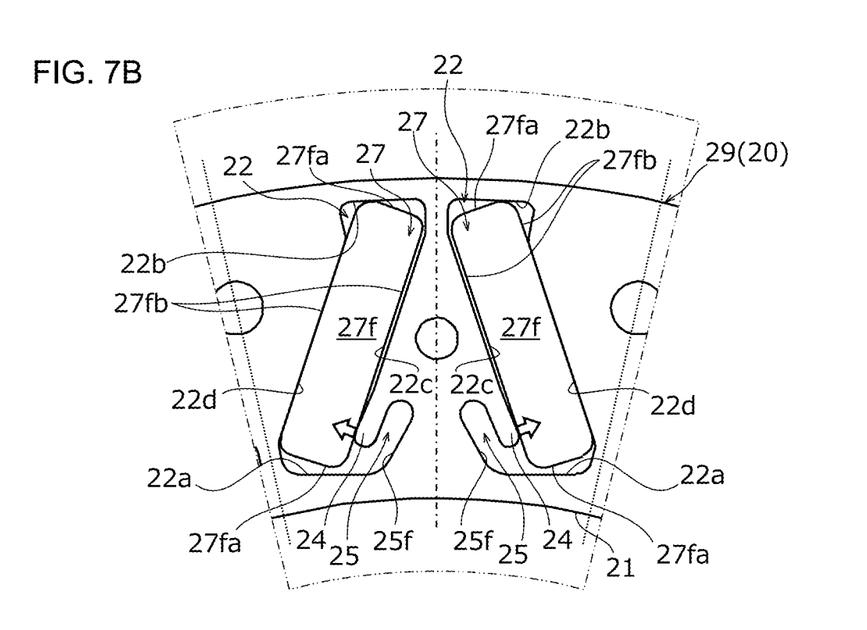
FIG. 7B is a view illustrating a rotor core in which a magnet is press-fitted in FIG. 7A.

A distance between the q-axis side surface 22c and the d-axis side surface 22d is equal to a length of the short side 27fa of the magnet 27. As illustrated in FIG. 7B, the magnet 27 is disposed between the q-axis side surface 22c and the d-axis side surface 22d such that the side surface having the long side 27fb faces the q-axis side surface 22c and the d-axis side surface 22d. The q-axis side surface 22c and the d-axis side surface 22d are wider than the inner side surface 22a and the outer side surface 22b. The inner side surface 22a and the outer side surface 22b are set at positions that do not interfere with corners of the end surface 27f of the magnet 27 when the magnet 27 is disposed in the magnet accommodating hole 22. When the magnet 27 is inserted into the magnet accommodating hole 22 having such a configuration, the short side 27fa of the magnet 27 is disposed in a state of being inclined with respect to the inner side surface 22a and the outer side surface 22b. At this time, a slight gap is formed between the short side 27fa and the inner side surface 22a of the magnet 27 and between the short side 27fa and the outer side surface 22b of the magnet 27. This gap functions as a flux barrier for controlling the flow of magnetic flux.

The rotor 2 is provided with a protrusion 24 for press-fitting and fixing the magnet 27 and a protrusion forming space 25 for forming the protrusion 24. By the protrusion 24 and the protrusion forming space 25, the magnet 27 is fixed to the rotor core 20 by press fitting without using an adhesive. As illustrated in FIG. 6, the protrusions 24 and the protrusion forming space 25 are provided in the magnet accommodating holes 22 in one-to-one correspondence and are provided as many as the number of magnet accommodating holes 22 and the number of magnets 27.

The protrusion 24 protrudes along the q-axis side surface 22c in the extending direction from the q-axis side and the radially inner side of the magnet accommodating hole 22. More specifically, as illustrated in FIG. 7A, the protrusion 24 protrudes along extending direction of the q-axis side surface 22c at the radially inner portion of the q-axis side surface 22c forming the magnet accommodating hole 22 and protrudes such that a part of the protrusion 24 enters the inner side of the magnet accommodating hole 22. As illustrated in FIG. 7B, when the magnet 27 is accommodated in the magnet accommodating hole 22, the protrusion 24 is elastically deformed toward the q-axis side and the radially inner side, and comes into pressure contact with the magnet 27 accommodated in the magnet accommodating hole 22 from the q-axis side end and the radially inner side. As a result, as indicated by an outlined arrow in the drawing, the magnet 27 is pressed against the d-axis side surface 22d of the magnet accommodating hole 22 and fixed in the magnet accommodating hole 22.

The protrusion forming space 25 is a cavity that penetrates in the axial direction and extends from the q-axis side surface 22c along the q-axis side surface 22c, and communicates with the magnet accommodating hole 22. The protrusion forming space 25 is notched on the q-axis side on the radially inner side from the tip end of the protrusion 24 and then extends toward radially outer side along the extending direction of the q-axis side surface 22c. The protrusion forming space 25 of the present embodiment is formed by being notched from the radially innermost end portion of the q-axis side surface 22c. Therefore, the protrusion forming surface 25f forming the protrusion forming space 25 of the present embodiment is directly connected to the inner side surface 22a of the magnet accommodating hole 22 without being connected to the q-axis side surface 22c. The protrusion 24 is defined by the protrusion forming space 25 and the magnet accommodating hole 22.

As illustrated in FIG. 7A, in the rotor 2 of the present embodiment, a length L of the protrusion 24 in a protruding direction (hereinafter, referred to as a "protruding length L") is longer than a length W in a width direction orthogonal to the protruding direction of the protrusion 24 (hereinafter, referred to as a "width dimension W"). As a result, the protrusion 24 is easily elastically deformed and the press-in force does not become excessive. In addition, the width dimension W of the protrusion 24 of the present embodiment is formed to be twice or less the plate thickness T (see FIG. 6) of one laminated core 29. Since the press-in force increases as the width dimension W of the protrusion 24 increases, setting the width dimension W to twice or less of the plate thickness T suppresses excessive press-in force. Furthermore, in the present embodiment, the width dimension W of the protrusion 24 is set to be equal to or larger than the plate thickness T, and normal pressing can be performed.

[2. Action and Effect]

(1) In the rotor 2 described above, the protrusion 24 protruding along the q-axis side surface 22c of the magnet accommodating hole 22 and the protrusion forming space 25 extending radially outward along the q-axis side surface 22c from the q-axis side surface 22c of the magnet accommodating hole 22 are provided. In other words, in the rotor 2 described above, a component of the q-axis side surface 22c in the extending direction is included in the protruding direction of the protrusion 24, and the protrusion 24 is configured to be displaceable toward the q-axis side by the protrusion forming space 25 extending radially outward along the q-axis side surface 22c. Therefore, the protrusion 24 is easily elastically deformed in a direction perpendicular to the extending direction of the q-axis side surface 22c as viewed in the axial direction, that is, on the q-axis side and the radially inner side, and the press-in force when the magnet 27 is press-fitted can be optimized. As a result, it is possible to solve the problem of the "residue generation" that occurs in a case where the press-in force is excessive. In addition, in the rotor 2 described above, since both the protrusion 24 and the protrusion forming space 25 are disposed on the q-axis side and the radially inner side of the magnet accommodating hole 22, the flow of the magnetic flux is not hindered. As a result, it is possible to prevent a decrease in the magnetic flux and secure the performance of the motor 1.

Figure 8A:
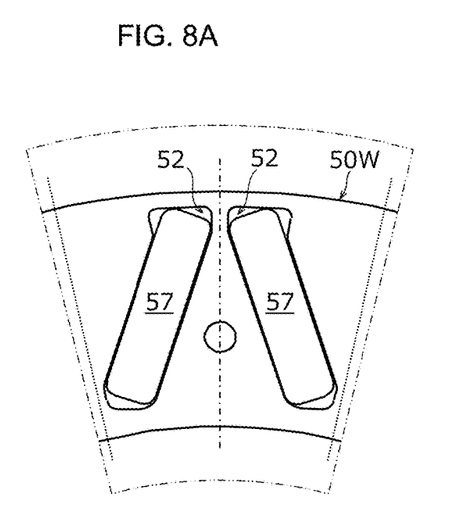
FIGS. 8A to 8D are views (views corresponding to FIG. 7B) for explaining comparative examples.

Here, as a comparative example, a rotor core 50W without a protrusion is illustrated in FIG. 8A. In addition, rotor cores 50X, 50Y, and 50Z provided with protrusions at positions different from those of the above-described rotor 2 are illustrated in each of FIGS. 8B to 8D as comparative examples. A magnet 57 having the same shape as the magnet 27 of the above-described embodiment is inserted into each of the rotor cores 50W, 50X, 50Y, and 50Z, and a magnet accommodating hole 52 for accommodating the magnet 57 is provided.

In addition, as illustrated in FIG. 8A, in a case where a magnet (not illustrated) is press-fitted and fixed to the rotor core 50W having no protrusion, the shape of the magnet accommodating hole 52 is slightly smaller than the outer shape of the magnet (not illustrated) to provide a press-in margin. However, in this case, the press-in force becomes excessive and the residue is generated. On the other hand, in the case of the rotor 2 (the rotor core 20) described above, since the press-in force can be optimized as described above by devising the shape of the protrusion 24, the residue is not generated.

Figure 8B:
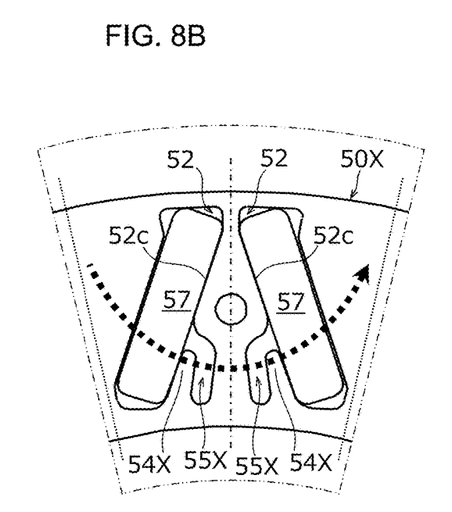

The rotor core 50X illustrated in FIG. 8B is similar to the rotor core 20 described above in that a protrusion 54X and a protrusion forming space 55X are provided on a q-axis side surface 52c forming the magnet accommodating hole 52. However, the rotor core 50X is different from the rotor core 20 in that the protrusion forming space 55X extends from the radially outer side toward the radially inner side. As a result of simulating the magnetic flux decreasing rate for the rotor having the rotor core 50X, the magnetic flux decreasing rate was 0.9%. The magnetic flux decreasing rate means a rate (%) of decrease with respect to a magnetic flux of a rotor having a rotor core having no protrusion (for example, a rotor core as illustrated in FIG. 8A) as a reference.

In a case where the protrusion forming space 55X is extended from the radially outer side to the radially inner side of the protrusion MX as in the rotor core 50X, the radially outer side portion of the protrusion forming space 55X overlaps the flow of the magnetic flux (the path of the magnetic flux) as indicated by a thick arrow in the drawing. For this reason, the protrusion MX and the protrusion forming space 55X inhibit the flow of the magnetic flux, the magnetic flux decreasing rate increases, and eventually, the performance of the motor is deteriorated.

To solve such a problem, in the rotor 2 described above, as described above, the protrusion forming space 25 extends from the radially inner side to the radially outer side of the protrusion 24 so that the protrusion forming space is disposed so as not to obstruct the flow of the magnetic flux (see FIG. 5). Therefore, as a result of performing the same simulation on the rotor 2 having the rotor core 20 described above, it has been found that the magnetic flux decreasing rate is 0.0% in the rotor 2. Therefore, according to the motor 1 including the rotor 2, the performance of the motor 1 can be secured.

Figure 8C:
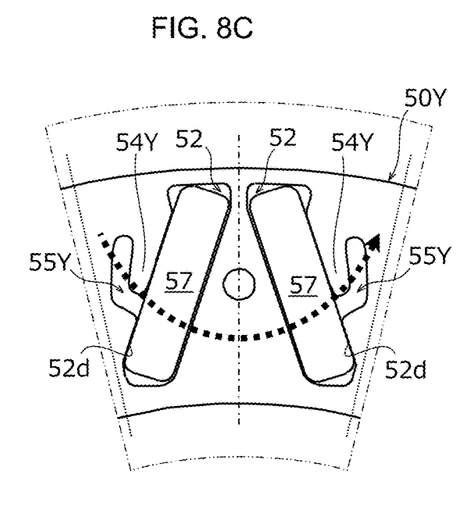

The rotor core 50Y illustrated in FIG. 8C is different from the rotor core 20 described above in that a protrusion MY and a protrusion forming space 55Y are provided on a d-axis side surface 52d forming the magnet accommodating hole 52. More specifically, in the rotor core 50Y, the protrusion 54Y and the protrusion forming space 55Y are provided at the radial central portion of the d-axis side surface 52d. As a result of simulating the magnetic flux decreasing rate for the rotor having the rotor core 50Y, the magnetic flux decreasing rate was 1.9%. In the rotor core 50Y, as indicated by a thick arrow in the drawing, the protrusion 54Y and the protrusion forming space 55Y overlap with the flow of the magnetic flux. For this reason, for the same reason as that of the rotor core 50X of FIG. 8B, the flow of the magnetic flux is hindered, and the performance of the motor is deteriorated. On the other hand, in the rotor 2 described above, since the protrusion 24 and the protrusion forming space 25 are provided on the q-axis side of the magnet accommodating hole 22 and are disposed so as not to obstruct the flow of the magnetic flux, the performance of the motor 1 can be secured.

Figure 8D:
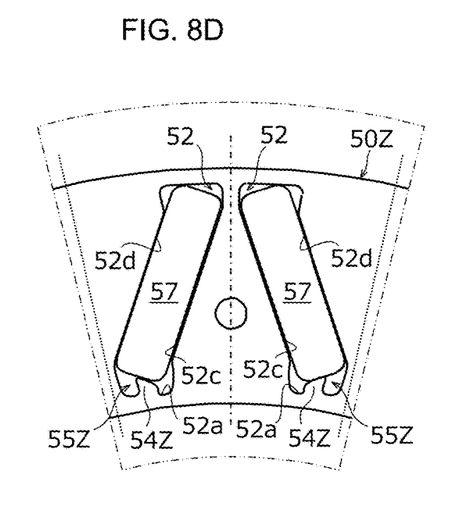

The rotor core 50Z illustrated in FIG. 8D is different from the rotor core 20 described above in that a protrusion 54Z and a protrusion forming space 55Z are provided on an inner side surface 52a forming the magnet accommodating hole 52. As a result of simulating the magnetic flux decreasing rate for the rotor having the rotor core 50Z, the magnetic flux decreasing rate was 0.4%. In addition, in the rotor core 50Z, since the protrusion 54Z is provided on the inner side surface 52a narrower than the q-axis side surface 52c and the d-axis side surface 52d, the length of the protrusion 54Z in the protruding direction cannot be secured. Therefore, the amount of deformation of the protrusion 54Z cannot be secured, and the press-in force may be excessive. On the other hand, in the rotor 2 (the rotor core 20) described above, by providing the protrusion 24 on the q-axis side surface 22c wider than the inner side surface 22a, a sufficient length in the protruding direction can be secured, and the press-in force can be optimized.

In addition, since all the plurality of laminated cores 29 configuring the rotor core 20 described above have the same shape, the transferring as in Republication of PCT International Publication No. WO 2018-189822 filed in Japanese is unnecessary. Therefore, the manufacturing cost can be suppressed without causing an increase in mold cost. Furthermore, since the adhesive is not used when the magnet 27 is fixed to the rotor core 20, the advantages of the rotor 2 and the motor 1 described above are that there are no disadvantages that occur when using an adhesive, for example, it requires drying time, dedicated equipment is required, the expiration date of the adhesive needs to be managed, or the like.

(2) In the rotor 2 described above, a protrusion forming surface 25f forming the protrusion forming space 25 is connected to the inner side surface 22a in the radially inner side forming the magnet accommodating hole 22. As described above, since the protrusion forming space 25 is provided on the radially innermost side of the magnet accommodating hole 22 and the flow of magnetic flux is less likely to be hindered, the performance of the motor 1 can be further secured.

(3) In the rotor 2 and the motor 1 described above, since the width dimension W of the protrusion 24 is twice or less the plate thickness T of one laminated core 29, it is possible to prevent the press-in force from becoming excessive, and it is possible to prevent generation of the residue at the time of press-fitting of the magnet 27.

(4) Furthermore, since the width dimension W of the protrusion 24 is equal to or larger than the plate thickness T (that is, "T≤W≤2×T" is satisfied.), the laminated core 29 can be formed by normal pressing without using a special mold or the like. Therefore, the manufacturing cost can be suppressed.

(5) In the rotor 2 and the motor 1 described above, since the protrusion length L of the protrusion 24 is longer than the width dimension W, it is possible to secure the spring force accompanying the elastic deformation of the protrusion 24 while preventing the press-in force from becoming excessive.

[3. Others]

The configurations of the rotor 2 and the motor 1 described in the above-described embodiment are merely examples, and are not limited to those described above. In the above-described embodiment, the protrusion forming space 25 is formed on the radially innermost end portion of the q-axis side surface 22c, but the protrusion forming space may be formed radially outward from this position. That is, the protrusion forming surface forming the protrusion forming space may be connected to the inner side surface via the q-axis side surface. If the position of the protrusion forming space is on the q-axis side and radially inner side of the magnet accommodating hole 22 and is a position where the protrusion forming spaces provided in each of the two adjacent magnet accommodating holes do not communicate with each other, the position thereof is not limited thereto. In addition, the protrusion length L and the width dimension W of the protrusion 24 may be set to dimensions different from the above dimensions. Each of the shapes or the configurations of the stator 3, the housing 4, and the like are not limited to those described above.

Second Embodiment

Figure 9:
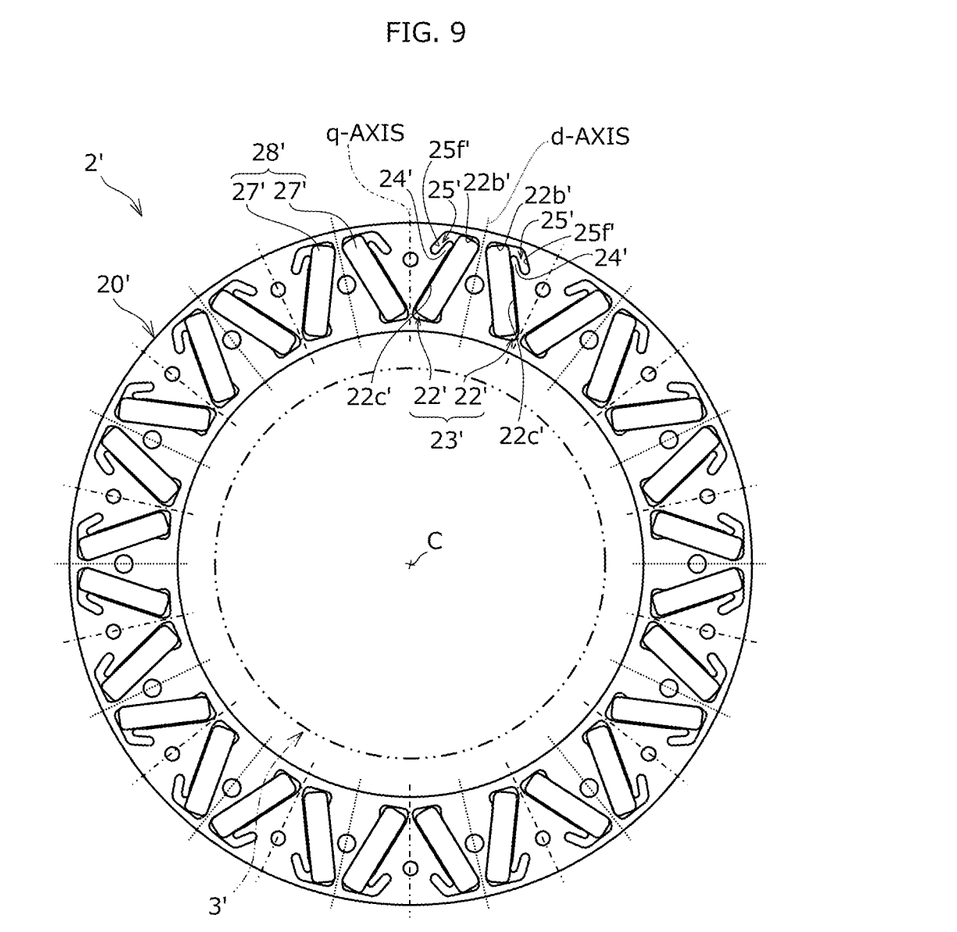
FIG. 9 is a plan view illustrating a rotor included in an outer rotor type brushless motor according to a second embodiment as viewed in an axial direction.

In the first embodiment described above, although the case where the motor 1 is an inner rotor type brushless DC motor has been illustrated, the motor to which the rotor of the present invention is applied may be an outer rotor type brushless DC motor. FIG. 9 is a plan view of a rotor 2' of the second embodiment as viewed from the axial direction. The rotor 2' of the second embodiment is applied to an outer rotor type brushless DC motor (not illustrated), and a stator 3' fixed to a housing of the motor and a shaft (not illustrated) which is a rotating shaft supporting the rotor 2' are disposed on an inner diameter side of the rotor 2'. In FIG. 9, only the outer shape of the stator 3' is indicated by a two-dot chain line, and the same numeral with a dash (') is used as a reference sign of an element corresponding to the element described in the first embodiment.

As illustrated in FIG. 9, the rotor 2' includes a cylindrical rotor core 20' (a core main body) in which a columnar space is formed on the rotation center C side, and a magnet 27' (a permanent magnet) embedded in the rotor core 20'. The rotor 2' further includes a magnet accommodating hole 22' for accommodating the magnet 27', a protrusion 24' for press-fitting and fixing the magnet 27', and a protrusion forming space 25' for forming the protrusion 24'. Similar to the rotor core 20 of the first embodiment, the rotor core 20' is configured by laminating a plurality of laminated cores 29 in the axial direction.

Similar to the magnet 27 of the first embodiment, the magnet 27' has a rectangular parallelepiped shape having a length equivalent to the axial length of the rotor core 20'. The plurality of the magnets 27' is provided and the plurality of magnets 27' is separately disposed so as to make one round in the circumferential direction of the rotor core 20, and two magnets 27 adjacent in the circumferential direction constitute one magnet pair 28.

The two magnets 27' configuring one magnet pair 28' are disposed in a V-shape so as to be separated from each other toward one side which is the stator side in the radial direction of the rotor core 20. In the brushless DC motor of the present embodiment, since the stator 3' is disposed on the radially inner side of the rotor 2', the "one side" is the "radially inner side of the rotor core 20". In addition, the "other side" which is the opposite side of the "one side" is the "radially outer side of the rotor core 20".

Two magnets 27 configuring one magnet pair 28 are arranged such that the same poles face each other. On the other hand, the adjacent pairs of the magnets 28' are disposed such that opposite poles face each other. As a result, a straight line between the two magnets 27 configuring the pair of magnets 28 in the radial direction is the d-axis which is the magnetic pole center. In addition, a straight line between the adjacent pairs of magnets 28' in the radial direction is a q-axis which is a magnetic pole boundary.

The magnet accommodating hole 22' is a through hole provided to penetrate the rotor core 20' in the axial direction, and similar to the magnet accommodating hole 22 of the first embodiment, the magnet accommodating hole has a substantially parallelogram shape as viewed in the axial direction. The magnet accommodating hole 22' are provided as many as the number of magnets 27' and are provided corresponding to the arrangement of the plurality of magnets 27' as described above. That is, the plurality of magnet accommodating holes 22 is separately disposed so as to make one round in the circumferential direction of the rotor core 20', and two magnet accommodating holes 22' adjacent in the circumferential direction configure one magnet accommodating hole pair 23'. The two magnet accommodating holes 22' configuring one magnet accommodating hole pair 23' are arranged in a V-shape so as to be spaced apart from each other toward the radially inner side symmetrically with respect to the d-axis.

The protrusions 24' and the protrusion forming space 25' are provided in the magnet accommodating holes 22' in one-to-one correspondence and are provided as many as the number of magnet accommodating holes 22' and the number of magnets 27'.

The protrusion 24' protrudes from the q-axis side and the radially outer side of the magnet accommodating hole 22' along the extending direction of the q-axis side surface (the q-axis side surface 22c') forming the magnet accommodating hole 22'. More specifically, the protrusion 24' protrudes along the q-axis side surface 22c in the extending direction at the radially outer portion of the q-axis side surface 22c' and protrudes such that a part of the protrusion 24' enters the inner side of the magnet accommodating hole 22'. As a result, when the magnet 27' is accommodated in the magnet accommodating hole 22', the protrusion 24' is elastically deformed toward the q-axis side and the radially outer side, and comes into pressure contact with the magnet 27' accommodated in the magnet accommodating hole 22' from the q-axis side and the radially outer side, thereby fixing the magnet 27'.

The protrusion forming space 25' is a cavity that penetrates in the axial direction and extends from the q-axis side surface 22c' along the q-axis side surface 22c', and communicates with the magnet accommodating hole 22'. The protrusion forming space 25' is notched on the q-axis side on the radially outer side from the tip end of the protrusion 24' and then extends radially inward along the extending direction of the q-axis side surface 22c'. The protrusion forming space 25' may be formed by being notched from the outmost end portion of the q-axis side surface 22c' in the radial direction. That is, the protrusion forming surface 25f forming the protrusion forming space 25' may be directly connected to the outer side surface 22b' (the other side surface) of the magnet accommodating hole 22' without being connected to the q-axis side surface 22c'. The protrusion 24' is defined by the protrusion forming space 25' and the magnet accommodating hole 22'.

Also in the rotor 2' described above and the motor to which the rotor 2' is applied, the same effects as those of the first embodiment can be obtained. That is, according to the rotor 2', since the protrusion 24' protruding along the q-axis side surface 22c' and the protrusion forming space 25' extending radially inward along the q-axis side surface 22c' from the q-axis side surface 22c' are provided, the press-in force when the magnet 27' is press-fitted can be optimized. Furthermore, in the rotor 2' described above, since both the protrusion 24' and the protrusion forming space 25' are disposed on the q-axis side and the radially outer side of the magnet accommodating hole 22', the flow of the magnetic flux is not hindered. As a result, it is possible to prevent a decrease in the magnetic flux and secure the performance of the motor.

In addition, since the protrusion forming surface 25f' forming the protrusion forming space 25' is connected to the radially outer side surface 22b' forming the magnet accommodating hole 22', in other words, since the protrusion forming space 25' is provided on the outermost side of the magnet accommodating hole 22' in the radial direction, the flow of the magnetic flux is hardly hindered and the performance of the motor can be further secured.

If the width dimension (the length in the width direction orthogonal to the protruding direction of the protrusion 24') of the protrusion 24' is twice or less the plate thickness of one laminated core, it is possible to prevent the press-in force from becoming excessive, and it is possible to prevent generation of the residue at the time of press-fitting of the magnet 27'. In addition, if the width dimension of the protrusion 24' is equal to or larger than the plate thickness of one laminated core, each laminated core can be formed by normal pressing without using a special mold or the like.

In addition, if the protrusion length of the protrusion 24' (the length of the protrusion 24' in the protruding direction) is longer than the width dimension of the protrusion 24', it is possible to secure the spring force accompanying the elastic deformation of the protrusion 24' while preventing the press-in force from becoming excessive.

The configurations of the rotor 2' and the motor to which the rotor 2' is applied are merely examples, and are not limited to those described above. Various modifications that can be applied to the rotor 2 of the first embodiment may be applied to the rotor 2'.

DESCRIPTION OF THE REFERENCE SYMBOLS 1 motor (brushless motor)
2, 2' rotor
3, 3' stator
4 housing
10 shaft
20 rotor core (core main body)
21 shaft hole
22, 22' magnet accommodating hole
22a inner side surface (other side surface)
22b' outer side surface (other side surface)
22c, 22c' q-axis side surface (side surface)
23, 23' magnet accommodating hole pair
24, 24' protrusion
25, 25' protrusion forming space
25f, 25f' protrusion forming surface
27, 27' magnet
28, 28' magnet pair
29 laminated core
C rotation center
L protrusion length of protrusion (length in protruding direction)
T thickness of laminated core
W width dimension of protrusion (length in width direction)

What is claimed is:

1. A rotor, comprising:
a cylindrical core main body that includes a plurality of laminated cores having the same shape and having a columnar space formed on a rotation center side;
a plurality of magnet accommodating hole pairs that is provided to penetrate the cylindrical core main body in an axial direction, includes a pair of magnet accommodating holes arranged in a V shape to be separated from each other toward a first side of the cylindrical core main body which is a stator side in a radial direction, and is provided to be separated from each other in a circumferential direction of the cylindrical core main body;
a plurality of permanent magnets accommodated and fixed in the plurality of magnet accommodating hole pairs, respectively;
protrusions provided in the pair of magnet accommodating holes in one-to-one correspondence,
each protrusion of the protrusions protruding from (i) a q-axis side as a magnetic pole boundary and (ii) a second side of the cylindrical core main body opposite to the first side in the radial direction, in an extending direction of a side surface of a corresponding magnet accommodating hole of the pair of magnet accommodating holes on the q-axis side, and coming into pressure contact with a permanent magnet of the plurality of permanent magnets accommodated in the corresponding magnet accommodating hole from the q-axis side and the second side; and
a protrusion forming space penetrating in the axial direction and extending from the side surface to the first side in the radial direction along the side surface, wherein the protrusion forming space overlaps the protrusions and the plurality of permanent magnets in the circumferential direction.

2. The rotor according to claim 1, wherein a protrusion forming surface forming the protrusion forming space is connected to a further side surface on the second side in the radial direction forming the magnet accommodating hole of the pair of magnet accommodating holes.

3. The rotor according to claim 1, wherein a length of said each protrusion in a width direction orthogonal to the extending direction is twice or less a plate thickness of one laminated core.

4. The rotor according to claim 3, wherein the length of said each protrusion in the width direction is equal to or greater than the plate thickness.

5. The rotor according to claim 1, wherein a length of said each protrusion in the extending direction is longer than a length of said each protrusion in a width direction orthogonal to the extending direction.

6. The rotor according to claim 1, wherein the rotor is disposed on a radially inner side of the stator, and the first side in the radial direction is a radially outer side and the second side in the radial direction is the radially inner side.

7. A brushless motor comprising:
the rotor according to claim 6;
a shaft configured to rotate integrally with the rotor; and
the stator that is fixed to a housing, has a space in which the rotor is disposed on an inner diameter side, and has a coil.

8. The rotor according to claim 1, wherein the side surface extends from the first side to the second side of the cylindrical core main body.

9. The rotor according to claim 1, wherein said each protrusion is between the protrusion forming space and the corresponding magnet accommodating hole in the circumferential direction.

* * * * *